(12) United States Patent
Zhou

(10) Patent No.: US 9,703,363 B2
(45) Date of Patent: Jul. 11, 2017

(54) POWER SUPPLY MODULE AND POWER SUPPLY SYSTEM WITH SEQUENTIAL SMART ACTIVATION/DEACTIVATION BASED ON LOAD

(75) Inventor: Jianjun Zhou, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 471 days.

(21) Appl. No.: 13/812,128

(22) PCT Filed: Jul. 26, 2011

(86) PCT No.: PCT/CN2011/077619
§ 371 (c)(1),
(2), (4) Date: Jan. 24, 2013

(87) PCT Pub. No.: WO2012/016492
PCT Pub. Date: Feb. 9, 2012

(65) Prior Publication Data
US 2013/0232362 A1  Sep. 5, 2013

(30) Foreign Application Priority Data
Aug. 3, 2010 (CN) .......................... 2010 1 0244469

(51) Int. Cl.
*G06F 1/32* (2006.01)
*G06F 1/26* (2006.01)
(Continued)

(52) U.S. Cl.
CPC ............ *G06F 1/3287* (2013.01); *G06F 1/263* (2013.01); *G06F 1/30* (2013.01); *H02J 1/10* (2013.01);
(Continued)

(58) Field of Classification Search
CPC .......... G06F 1/26; G06F 1/3287; G06F 1/263; G06F 1/30; G06F 11/2015; H02J 1/10; Y02B 60/1282
(Continued)

(56) References Cited

U.S. PATENT DOCUMENTS 6,041,414 A * 3/2000 Kikuchi ........................ 713/300
6,153,946 A * 11/2000 Koch et al. .................... 307/64
(Continued)

FOREIGN PATENT DOCUMENTS

CN    1716160 A    1/2006
CN    10801012 A   7/2006
(Continued)

OTHER PUBLICATIONS

International Search Report and Written Opinion of the Chinese Intellectual Property Office in application No. PCT/CN2011/077619, dated Nov. 3, 2011.

*Primary Examiner* — Zahid Choudhury
*Assistant Examiner* — Danny Chan
(74) *Attorney, Agent, or Firm* — Kinney & Lange, P.A.

(57) ABSTRACT

The present disclosure provides a power supply module and a power supply system. The power supply module is used as a first power supply module in a computing system which further includes a second power supply module. The first power supply module and the second power supply module are cascaded in sequence. The first power supply module is in a power supplying state and the second power supply module is in an off state. The first power supply module itself is capable of automatically determining whether to turn on another power supply module or not, without any human intervention. In this way, the power distribution
(Continued)

board can be simplified, or even eliminated, in which case the individual power supply modules can be connected by wire to reduce the cost.

8 Claims, 6 Drawing Sheets

(51) Int. Cl.
    *G06F 1/30* (2006.01)
    *H02J 1/10* (2006.01)
    *G06F 11/20* (2006.01)
(52) U.S. Cl.
    CPC ....... *G06F 11/2015* (2013.01); *Y02B 60/1282* (2013.01)
(58) Field of Classification Search
    USPC .......................................... 713/300
    See application file for complete search history.

(56) References Cited

U.S. PATENT DOCUMENTS

| | | | | |
|---|---|---|---|---|
| 6,766,222 | B1* | 7/2004 | Duley | 700/286 |
| 7,337,342 | B1* | 2/2008 | O'Brien | 713/330 |
| 2004/0095021 | A1 | 5/2004 | Fogleman et al. | |
| 2005/0116546 | A1* | 6/2005 | Zeighami et al. | 307/51 |
| 2006/0146461 | A1* | 7/2006 | Jones et al. | 361/62 |
| 2007/0123304 | A1* | 5/2007 | Pattenden et al. | 455/557 |
| 2007/0143634 | A1* | 6/2007 | Chou et al. | 713/300 |
| 2007/0284431 | A1* | 12/2007 | Pan | 235/375 |
| 2008/0028237 | A1* | 1/2008 | Knight | 713/300 |
| 2008/0168281 | A1* | 7/2008 | MacInnes | 713/300 |
| 2009/0265571 | A1* | 10/2009 | Furukawa et al. | 713/340 |
| 2009/0307514 | A1* | 12/2009 | Roberts et al. | 713/330 |
| 2009/0315397 | A1* | 12/2009 | Udo | 307/31 |
| 2010/0052426 | A1* | 3/2010 | Carter et al. | 307/64 |
| 2010/0327656 | A1* | 12/2010 | Humphrey et al. | 307/43 |
| 2011/0261547 | A1* | 10/2011 | Kinnard | 361/807 |
| 2013/0339757 | A1* | 12/2013 | Reddy | G06F 1/3212 713/300 |

FOREIGN PATENT DOCUMENTS

| | | |
|---|---|---|
| CN | 101369733 A | 2/2009 |
| CN | 101458553 A | 6/2009 |
| JP | 2001204172 A | 7/2001 |
| JP | 2005261116 A | 9/2005 |
| JP | 2007068321 A | 3/2007 |

\* cited by examiner

POWER SUPPLY MODULE AND POWER SUPPLY SYSTEM WITH SEQUENTIAL SMART ACTIVATION/DEACTIVATION BASED ON LOAD

TECHNICAL FIELD

The present invention relates to power management technology, and more particularly, to a power supply module and a power supply system.

BACKGROUND

Typically, an electronic device has redundant power supply modules. When the load power consumption of the electronic device is very high, it is shared among the individual power supply modules. However, due to the effect of power saving techniques applied in the electronic device, when the load consumes less power, it is necessary to consider how to reduce the power consumption of the redundant power supply modules themselves.

From the perspective of electrical characteristics of a power supply itself, a power supply can reach its nominal efficiency only when its load consumes over 20% of its nominal power. When the load consumes less than 20% of its nominal power, the efficiency of the power supply itself drops rapidly and will be typically maintained at around 50%. When an electronic device has a number of power supply modules and its load consumes little power, each power supply module is assigned with little output power, resulting in low efficiency. In this case, the overall efficiency of the power supply will be very low.

Conventionally, all redundant power supply modules are connected in parallel and are current equalized and connected for output via a substrate. Only one system activation signal is input to a distribution board and all of the redundant power supply modules are turned on/off concurrently.

The inventors recognized at least the following problems in the prior art. During a process in which the redundant power supply modules supply power, all of the redundant power supply modules have to be turned on or off at the same time. In other words, it is impossible to turn on some modules while turning off the others. However, since the load power consumption of the electronic device is relatively low, each of the redundant power supply modules may be assigned with low power consumption, resulting in low power efficiency. Human intervention can be introduced. However, it requires operators to have full knowledge of the load power consumption requirements of the entire electronic device as well as the output power of each redundant power supply module, which is very difficult for the operators.

SUMMARY

An object of the present invention is to provide a power supply module and a power supply system to solve the problems in the prior art that, during a process in which redundant power supply modules supply power, all of the redundant power supply modules have to be turned on or off at the same time, resulting in low power efficiency, and that the human operation for power management is too difficult.

According to the present invention, a power supply module is provided. The power supply module is used as a first power supply module in a computing system which further includes a second power supply module. The first power supply module and the second power supply module are cascaded in sequence. The first power supply module is in a power supplying state and the second power supply module is in an off state. The first power supply module includes: a load detection unit configured to detect load of the computing system to generate a load detection value; a determination unit connected to the load detection unit and configured to generate determination information based on the load detection value for determining whether to turn on the second power supply module or not; and a turn-on/off unit configured to send a power supply on (PSON) signal to the second power supply module when the determination information indicates that the second power supply module is to be turned on. The second power supply module is turned on in response to the PSON signal.

Preferably, the load detection unit includes: a current detection unit configured to detect an output current from the power supply module itself and generate a current detection value as the load detection value.

Preferably, the determination unit is configured to determine to turn on the second power supply module when the current detection value is larger than a first current threshold.

Preferably, the power supply module further includes: a voltage detection unit configured to detect its own output voltage and convert it into a voltage detection value for outputting. The power supply module determines that it is in the power supplying state when the voltage detection value is larger than an operating voltage threshold.

Preferably, the power supply module further includes: a current equalization unit configured to adjust output currents from the first power supply module and the second power supply module based on a predetermined power balancing rule, such that the output current from each of the power supply modules is equalized.

Preferably, the power supply module further includes: an emergency module configured to send an emergency instruction to the second power supply module in a case of a failure of the first power supply module itself, instructing the second power supply module to switch to the power supplying state and replace the first power supply module for power supplying.

According to the present invention, a power supply module is provided. The power supply module used as a fourth power supply module in a computing system which further includes a third power supply module. The third power supply module and the fourth power supply module are cascaded in sequence. Each of the third power supply module and the fourth power supply module is in a power supplying state. The fourth power supply module includes: a load detection unit configured to detect load of the computing system to generate a load detection value; a determination unit configured to generate determination information based on the load detection value for determining whether to turn off the fourth power supply module or not; and a turn-on/off unit configured to send request information to the third power supply module when the determination information indicates that the fourth power supply module is to be turned off, instructing the third power supply module to send a power supply off signal to the fourth power supply module. The fourth power supply module is turned off in response to the power supply off signal.

Preferably, the load detection unit includes: a current detection unit configured to detect its own output current and generate a current detection value as the load detection value. The determination unit is configured to determine to turn off the fourth power supply module itself when the current detection value is smaller than a second current threshold.

The fourth power supply module further includes: a voltage detection unit configured to detect its own output voltage and convert it into a voltage detection value for outputting. The fourth power supply module determines that it is in the power supplying state when the voltage detection value is larger than an operating voltage threshold.

According to the present invention, a power supply system is provided. The power supply system includes at least two power supply modules and a power distribution board. The at least two power supply modules include a first power supply module and a second power supply module, both used in a computing system. The first power supply module and the second power supply module are cascaded in sequence. The first power supply module is in a power supplying state and the second power supply module is in an off state. The first power supply module includes: a load detection unit configured to detect load of the computing system to generate a load detection value; a determination unit connected to the load detection unit and configured to generate determination information based on the load detection value for determining whether to turn on the second power supply module or not; and a turn-on/off unit configured to send a power supply on (PSON) signal to the second power supply module when the determination information indicates that the second power supply module is to be turned on. The second power supply module is turned on in response to the PSON signal. Alternatively, each of the first power supply module and the second power supply module is in a power supplying state. The second power supply module includes: a load detection unit configured to detect load of the computing system to generate a load detection value; a determination unit configured to generate determination information based on the load detection value for determining whether to turn off the second power supply module or not; and a turn-on/off unit configured to send request information to the first power supply module when the determination information indicates that the second power supply module is to be turned off, instructing the first power supply module to send a power supply off signal to the second power supply module. The second power supply module is turned off in response to the power supply off signal.

Preferably, the power supply system further includes: a signal support module configured to support the following signals by using discrete circuit transmission or software protocol: the power supply on signal and the power supply off signal sent from the first power supply module to the second power supply module; the power supply on signal and the power supply off signal received from the first power supply module at the second power supply module; the voltage detection value received from the second power supply module at the first power supply module; a power supply off request sent from the first power supply module to the second power supply module for itself; and a power supply off request received from the second power supply module at the first power supply module.

With the solutions according to the present invention, the power supply module itself is capable of automatically determining whether to turn on a new power supply module or not, without any human intervention. When the load power consumption of the electronic device increases, one or more power supply modules can be added and the power supplied by the power supply modules can be adjusted automatically. When the load power consumption of the electronic device decreases, one or more power supply modules can be automatically turned off to maximize the overall efficiency of the redundant power modules. The operations involved in this process, such as current detection and current equalization are implemented inside the power supply modules. In this way, the original power distribution board can be simplified, or even eliminated, in which case the individual power supply modules can be connected by wire to reduce the cost.

DETAILED DESCRIPTION OF THE EMBODIMENTS

Figure 1:
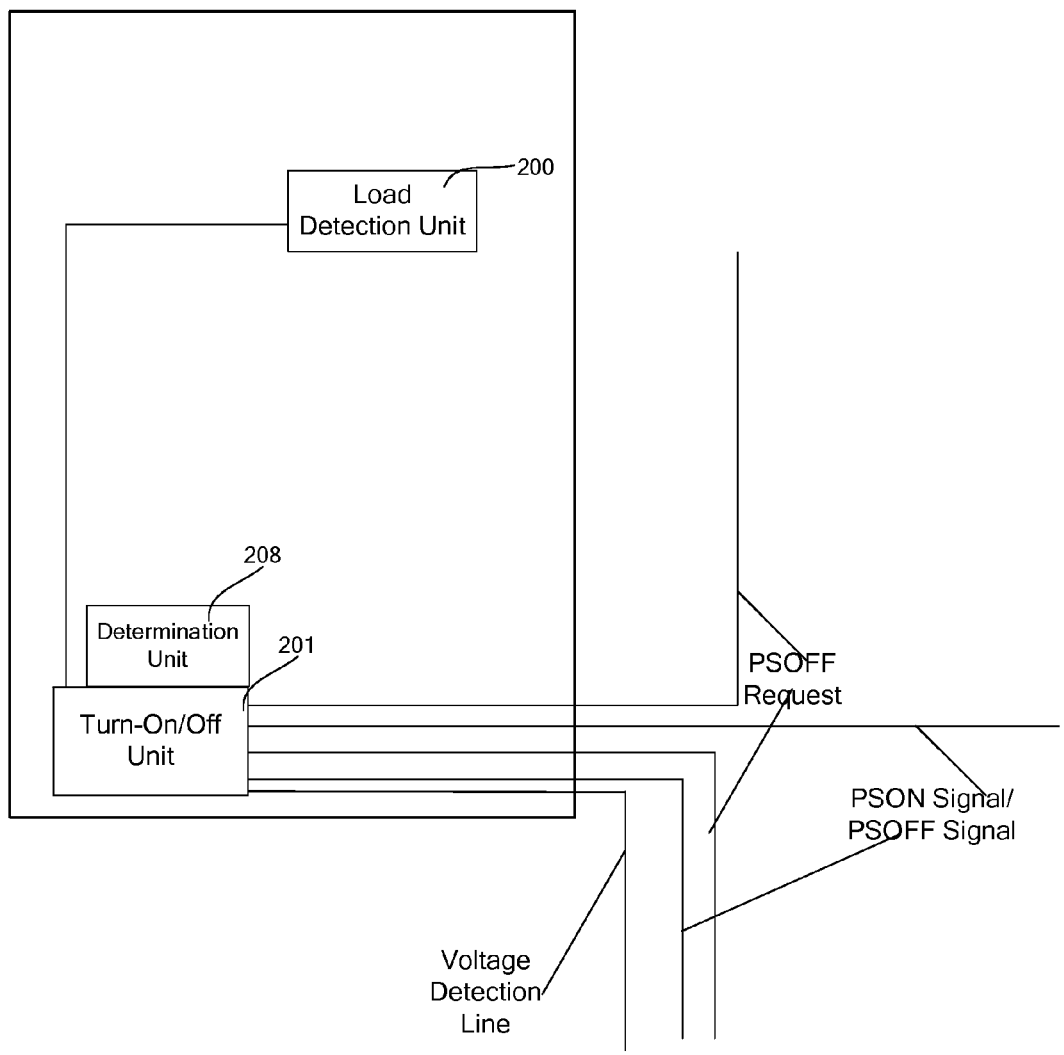
FIG. 1 is a first schematic diagram of the structure of a power supply module according to an embodiment of the present invention.

In the following, the solutions of the present invention will be detailed with reference to the figures and embodiments, such that the objects, features and effects of the present invention will be more apparent. In the embodiments of the present invention, when the load power consumption of an electronic device increases, the number of power supply modules in the operating state (power supplying state) can be automatically increased in a cascading order. On the other hand, when the load power consumption of the electronic device decreases, one or more power supply modules can be sequentially turned off again. In this way, the efficiency of the redundant power supply modules can be maximized and power is saved.

The power supply module according to the present embodiment differs from the power supply module according to the prior art in that, during the process in which the individual power supply modules are turned on/off in a cascaded manner and output power, each power supply module can send a power supply on signal to a power supply module at its next stage and a power supply off request to a power supply module at its previous stage. Herein, if a power supply module is the first power supply module in such cascaded structure, it directly receives a power supply on signal from another element (e.g., a power distribution board 200) and is turned on in response to the power supply on signal for supplying power. If a power supply module is the last power supply module in such cascaded structure, it only needs to send a power supply off request to the power supply module at its previous stage.

In order to facilitate the understanding of the technical concept of the present invention, power supply modules having different functions are provided in various embodiments including:

a power supply module having only a function of turning on the power supply module at its next stage and configured to send a power supply on signal to the power supply module at its next stage when it is determined to increase the output power;

a power supply module having only a function of turning itself off and configured to send a power supply off signal to the power supply module at its previous stage when it is determined to decrease the output power; and a power supply module capable of both sending a power supply on signal to the power supply module at its next stage and sending a power supply off request to the power supply module at its previous stage, and also capable of determining whether it is the last one among all the power supply modules in the power supplying state prior to sending the power supply off request.

Of course, for easy implementation, each of the power supplying modules can send a power supply on signal to the power supplying module at its next stage and send a power supply off request to the power supplying module at its previous stage. When the power supplying module is the first one in a set of power supplying modules, it can still send a power supply off request to the power supplying module at its previous stage. In this case, however, there is no power supplying module at its previous stage for receiving this signal and the power supply off request is thus invalid. Similarly, when the power supplying module is the last one in a set of power supplying modules, it can still send a power supply on signal to the power supplying module at its next stage. In this case, however, there is no power supplying module at its next stage for receiving this signal and the power supply on signal is thus invalid.

FIG. 1 shows a power supply module according to an embodiment of the present invention. The power supply module is used as a first power supply module in a computing system which further includes a second power supply module. The first power supply module and the second power supply module are cascaded in sequence. The first power supply module is in a power supplying state and the second power supply module is in an off state. The first power supply module includes:

a load detection unit 200 configured to detect load of the computing system to generate a load detection value;

a determination unit 208 connected to the load detection unit 200 and configured to generate determination information based on the load detection value for determining whether to turn on the second power supply module or not; and a turn-on/off unit 201 configured to send a power supply on (PSON) signal to the second power supply module when the determination information indicates that the second power supply module is to be turned on.

The second power supply module is turned on in response to the PSON signal.

With the above solution, it is possible to automatically determine whether to turn on a new power supply module or not. When the load power consumption of the electronic device is relatively high, one or more power supply modules can be automatically added and the power supplied by the power supply modules can be adjusted automatically. The entire process is completely automated without any human intervention. All the circuits for detection, determination and power supply efficiency control are implemented inside the power supply modules. In this way, the power distribution board can be greatly simplified, or even eliminated, in which case the individual power supply modules can be connected by wire to reduce the cost.

Here, the first power supply module and the second power supply module being cascaded in sequence means that, based on the value of the output power, the first power supply module may send a power supply on signal or a power supply off signal to the second power supply module. Alternatively, when there are a number of power supply modules, a power supply module can send a power supply on signal or a power supply off signal to a power supply module at its next stage. In this way, these power supply modules are turned on or off sequentially. That is, these power supply modules are turned on or off in a cascaded manner, compared with the conventional power supply system in which a single power on or off signal turns on or off all the power supply modules at the same time. What shall be noted is that, after they are turned on in such cascaded manner, two (or more) power supply modules provide output power in parallel. In other words, the on/off operations are carried out in a cascaded manner, while the power is output in parallel.

It is to be noted that, in the above solution, the individual power supply modules are referred to as the first, second, third and fourth power supply modules, respectively, for the purpose of illustration. However, the name "first power supply module" does not imply that it is the very power supply module that is arranged in the first physical location in the cascaded structure and receives the power supply on signal from the power distribution board. Instead, the name is given only to distinguish it from the other power supply modules in terms of the relative locations in the cascaded structure. The same is also true for the descriptions of "power supply module at the previous stage" and "power supply module at the next stage". For example, the name "first power supply module" does not imply that it is the very power supply module that is arranged in the first physical location in the cascaded structure and receives the power supply on signal from the power distribution board. Thus, the first power supply module may have its previous power supply module. Here, the first power supply module and the second power supply module being cascaded in sequence means that the first power supply module is arranged at the previous stage of the second power supply module. Similarly, the third power supply module and the fourth power supply module being cascaded in sequence means that the third power supply module is arranged at the previous stage of the fourth power supply module.

Figure 2:
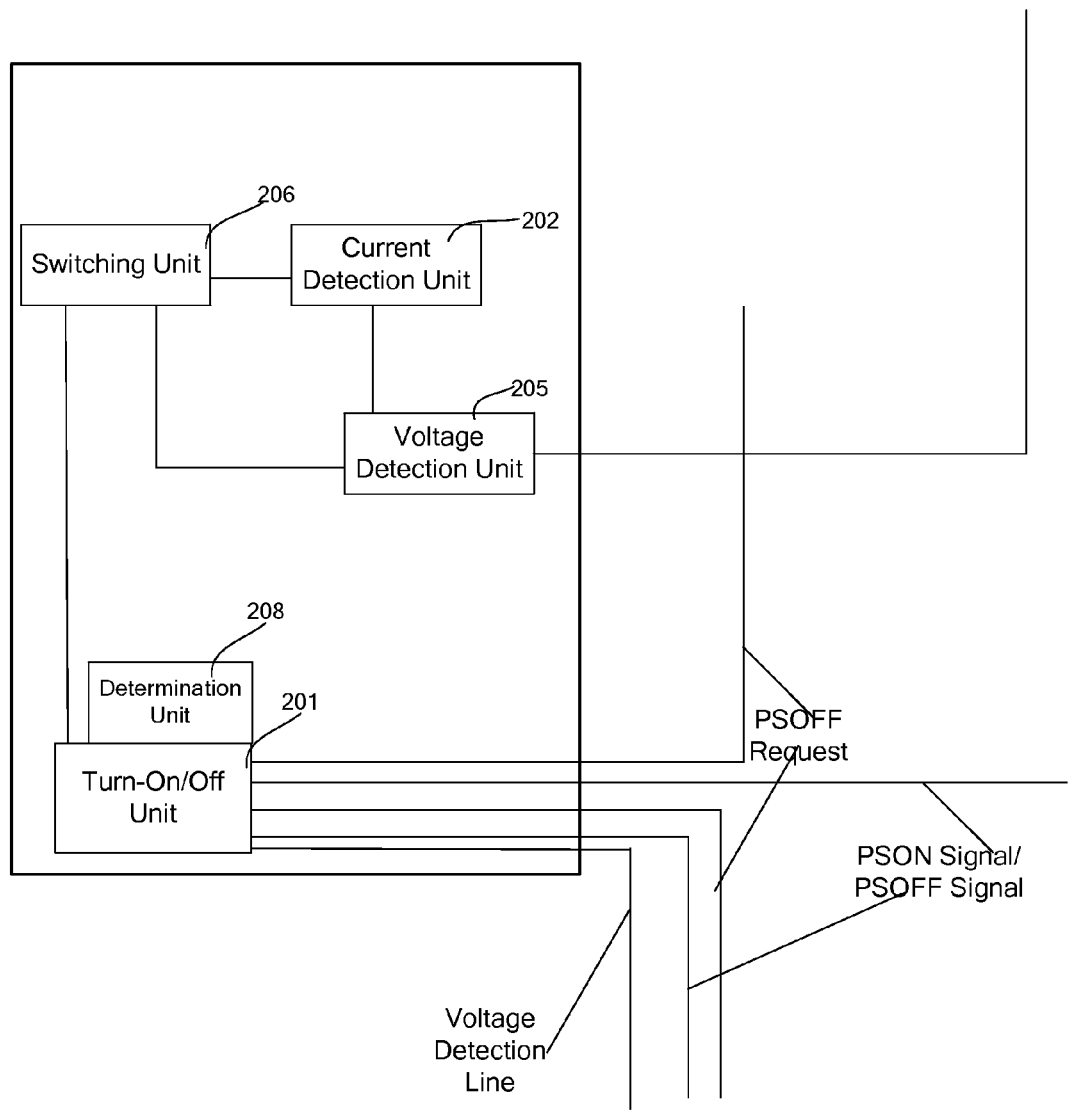
FIG. 2 is a second schematic diagram of the structure of a power supply module according to an embodiment of the present invention.

FIG. 2 shows a power supply module according to another embodiment of the present invention. The power supply module shown in FIG. 2 differs from the power supply module shown in FIG. 1 in the following aspects.

The load detection unit 200 includes a current detection unit 202 configured to detect an output current from the power supply module itself and generate a current detection value as the load detection value.

The determination unit 208 is capable of processing the current detection value and configured to determine that its own load exceeds a nominal value and the second power supply module is to be turned on when the current detection value is larger than a first current threshold.

The power supply module shown in FIG. 2 further includes a voltage detection unit 205 configured to detect its own output voltage and convert it into a voltage detection value for outputting. The power supply module determines that it is in the power supplying state when the voltage detection value is larger than an operating voltage threshold.

Figure 3:
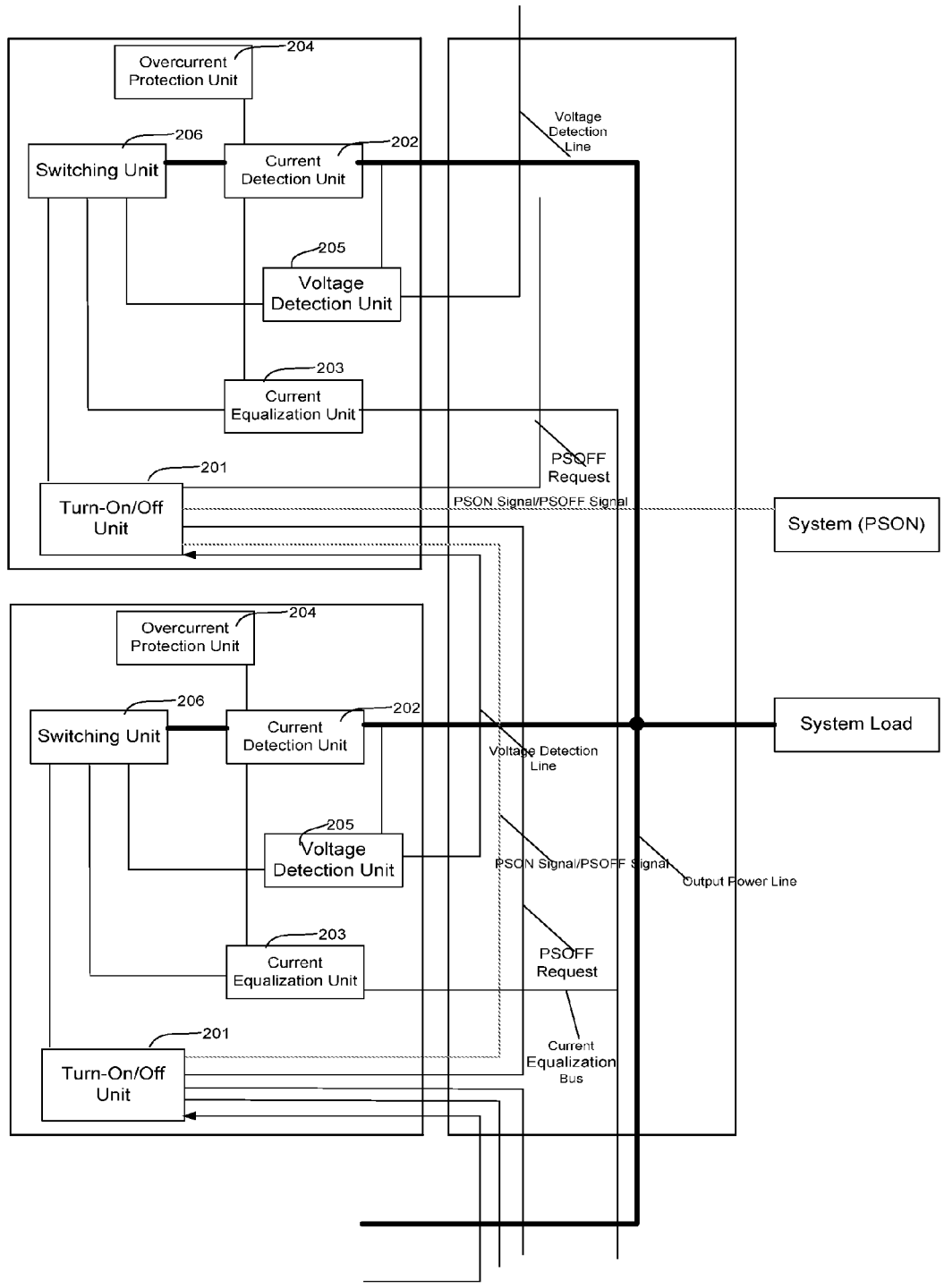
FIG. 3 is a schematic diagram of the structure of a power supply system according to an embodiment of the present invention.

FIG. 3 shows a power supply module according to yet another embodiment of the present invention. The power supply module further includes a current equalization unit 203 configured to adjust output currents from the first power supply module and the second power supply module based on a predetermined power balancing rule, such that the output current from each of the power supply modules is equal to or smaller than the first current threshold. Here, after being turned on in a cascaded manner, the first and second power supply modules output power in parallel.

According to an embodiment of the present invention, the power supply module further includes an emergency module configured to send an emergency instruction to the second power supply module in a case of a failure of the first power supply module itself, instructing the second power supply module to switch to the power supplying state and replace the first power supply module for power supplying.

According to an embodiment of the present invention, the power supply module further includes a signal support module configured to support the following signals by using discrete circuit transmission or software protocol:
the power supply on signal and the power supply off signal sent to the second power supply module if it is the first power supply module;
the power supply on signal and the power supply off signal received from the first power supply module if it is the second power supply module;
the voltage detection value received from the second power supply module if it is the first power supply module;
a power supply off request sent from the first power supply module for itself if it is the second power supply module; and
a power supply off request received from the second power supply module if it is the first power supply module.

Accordingly, a power supply module is also provided according to an embodiment of the present invention. The power supply module is used as a fourth power supply module in a computing system which further includes a third power supply module. The third power supply module and the fourth power supply module are cascaded in sequence. Each of the third power supply module and the fourth power supply module is in a power supplying state. The fourth power supply module includes: a load detection unit configured to detect load of the computing system to generate a load detection value; a determination unit connected to the load detection unit and configured to generate determination information based on the load detection value for determining whether to turn off the fourth power supply module or not; and a turn-on/off unit configured to send request information to the third power supply module when the determination information indicates that the fourth power supply module is to be turned off, instructing the third power supply module to send a power supply off signal to the fourth power supply module. The fourth power supply module is turned off in response to the power supply off signal.

Herein, in the fourth power supply module, the load detection unit 200 includes: a current detection unit 202 configured to detect its own output current and generate a current detection value as the load detection value. The determination unit 208 is capable of processing the current detection value and configured to determine that its own load exceeds a nominal value and the fourth power supply module itself is to be turned on when the current detection value is larger than a first current threshold.

The fourth power supply module further includes: a voltage detection unit 205 configured to detect its own output voltage and convert it into a voltage detection value for outputting. The fourth power supply module determines that it is in the power supplying state when the voltage detection value is larger than an operating voltage threshold.

During the interoperation of the individual power supply modules, a switching unit 206 is provided. The switching unit 206 is connected with a turn-on/off unit 201, the voltage detection unit 205 and the current detection unit 202 and configured to control the pulse width of a high frequency switching signal, so as to adjust the value of the output voltage. The operating principle is that the value of the output voltage can be adjusted by controlling the pulse width of the high frequency switching signal (PWM, Pulse Width Modulation) using a closed loop feedback circuit for the voltage and current detections. The output voltage increases as the pulse width is widened and decreases as the pulse width is narrowed.

The voltage detection unit 205 is further configured to form the closed loop feedback circuit with the switching unit 206, so as to control the PWM by the switching unit 206 based on the voltage detection value.

As shown in FIG. 3, the power supply module according to an embodiment of the present invention can be further provided with an overcurrent protection unit 204 for setting a threshold Ip. When the current detection value received from the current detection unit 202 is larger than the threshold Ip, an overcurrent protection operation is carried out to turn off the power supply module. The overcurrent protection unit 204 has a time delay during which the turn-on/off unit 201 has sufficient time to determine whether to turn on the power supply module at its next stage or not. Once the power supply module at the next stage is turned on during the time delay, the newly added power supply module is assigned with a part of load current after current equalization. In this case, the current in the power supply module triggering the overcurrent protection operation decreases and the overcurrent protection operation is terminated.

It can be seen that the power supply modules can be combined with each other. After being cascaded, each power supply module serves as a part of a power supply device. With the above solution, these power supply modules can interoperate with each other. They can be turned on or off in a cascaded manner and output power in parallel.

If there are not only the power supply modules according to the embodiments of the present invention, but also conventional power supply modules in the cascaded structure, the conventional power supply modules can be used as backup power supply modules. Alternatively, the conventional power supply modules can provide constant power output for the electronic device, while the power supply modules according to the embodiments of the present invention supply power according to the solutions according to the above embodiments.

According to the present invention, a power supply system is provided, in which the power supply module according to the present invention is applied. As shown in FIG. 3, the power supply system includes at least two power supply modules and a power distribution board 200. The at least two power supply modules include a first power supply module and a second power supply module, both used in a computing system. The first power supply module and the second power supply module are cascaded in sequence.

Here, the power supply modules are capable of interoperating with each other to supply power, as described below.

The first power supply module is in a power supplying state and the second power supply module is in an off state. The first power supply module includes: a load/current detection unit 202 configured to detect load of the computing system to generate a load detection value; a determination unit (not shown) connected to the load detection unit and configured to generate determination information based on the load detection value for determining whether to turn on the second power supply module or not; and a turn-on/off unit 206 configured to send a power supply on (PSON)

signal to the second power supply module when the determination information indicates that the second power supply module is to be turned on. The second power supply module is turned on in response to the PSON signal.

Alternatively, each of the first power supply module and the second power supply module is in a power supplying state. The second power supply module includes: a load/current detection unit 202 configured to detect load of the computing system to generate a load detection value; a determination unit (not shown) configured to generate determination information based on the load detection value for determining whether to turn off the second power supply module or not; and a turn-on/off unit 206 configured to send request information to the first power supply module when the determination information indicates that the second power supply module is to be turned off, instructing the first power supply module to send a power supply off signal to the second power supply module. The second power supply module is turned off in response to the power supply off signal.

It is to be noted that, in the above solution, the individual power supply modules are referred to as the first and second power supply modules, respectively, for the purpose of illustration. However, the name "first power supply module" does not imply that it is the very power supply module that is arranged in the first physical location in the cascaded structure and receives the power supply on signal from the power distribution board. Instead, the name is given only to distinguish it from the other power supply modules in terms of the relative locations in the cascaded structure. Here, the first power supply module and the second power supply module being cascaded in sequence means that the first power supply module is arranged at the previous stage of the second power supply module.

The power supply modules in the electronic device can be extended. As shown in FIG. 3, each of the power supply modules in the electronic device includes a turn-on/off unit 201, a current detection unit 202, a current equalization unit 203, an overcurrent protection unit 204, a voltage detection unit 205, a switching unit 206 and a power distribution unit 207 (not shown). Here, the power distribution unit 207 is located outside the power supply modules and connected with the individual power supply modules via different signal lines. The functions of the respective units will be described in the following.

The current detection unit 202 detects the output current from the power supply module and sends a current detection value to the current equalization unit 203, the turn-on/off unit 201 and the overcurrent protection unit 204 for further processing.

The current equalization unit 203 initiatively performs the current equalization operation. The current equalization unit 203 compares the current detection value received from the current detection unit 202 with a current equalization bus. When the output current is determined to be smaller than the current equalization bus, the output current is compensated such that the output current can reach the average of the output currents from all of the power supply modules. On the other hand, when the output current is determined to be larger than the current equalization bus, the output current is compensated such that the output current can reach the average of the output currents from all of the power supply modules. There is a current equalization bus in the output signals from the power supply module, which is obtained from the most typical one of the current detections values for all of the power supply modules. Then, the current detection value for each power supply module is compared with the current equalization bus. The comparison result is logically operated with the voltage detection value from the voltage detection unit to obtain an operation result for controlling the switching unit 206. The switching unit 206 adjusts the pulse width of the switching power supply (PWM), so as to adjust the output current. The current equalization unit 203 is implemented using an application specific IC or a discrete circuit available from major companies in the world and can take any of various forms, which will not affect the technical feasibility of the embodiments of the present invention.

The overcurrent protection unit 204 sets a threshold Ip. When the current detection value received from the current detection unit 202 is larger than the threshold Ip, an overcurrent protection operation is carried out to turn off the power supply module. The overcurrent protection unit 204 has a time delay during which the turn-on/off unit 201 has sufficient time to determine whether to turn on the power supply module at its next stage or not. Once the power supply module at the next stage is turned on during the time delay, the newly added power supply module is assigned with a part of load current after current equalization. In this case, the current in the power supply module triggering the overcurrent protection operation decreases and the overcurrent protection operation is terminated.

When the power supply module is operating, the voltage detection unit 205 detects the output voltage and converts it into a logical signal VS. When the power supply module is not operating, VS=0. At the same time, a closed loop feedback circuit is formed for output voltage detection, so as to control the PWM by the switching unit 206.

The switching unit 206 is connected with the turn-on/off unit 201, the voltage detection unit 205 and the current detection unit 202 and is configured to achieve the function of adjusting the output voltage. The operating principle is that the value of the output voltage can be adjusted by controlling the pulse width of the high frequency switching signal (PWM, Pulse Width Modulation) using a closed loop feedback circuit for voltage and current detections. The output voltage increases as the pulse width is widened and decreases as the pulse width is narrowed.

According to an embodiment of the present invention, the power supply module further includes a signal support module configured to support the following signals by using discrete circuit transmission or software protocol:

the power supply on signal and the power supply off signal sent to the second power supply module if it is the first power supply module;

the power supply on signal and the power supply off signal received from the first power supply module if it is the second power supply module;

The voltage detection value received from the second power supply module if it is the first power supply module;

a power supply off request sent from the first power supply module for itself if it is the second power supply module; and a power supply off request received from the second power supply module if it is the first power supply module.

These five signals can be implemented by using discrete lines or software protocols. Here, the functions of the respective signals will be detailed to enable those skilled in the art to implement these signals. The main function is as follows.

(A) It is possible to memorize whether a power supply off signal or a power supply on signal is sent to the power supply module at the next stage.

Based on the logical level of the voltage detection value VS received from the power supply module at the next stage, it is determined whether the power supply module at the next stage is in the power supplying state or the off state. It is further determined whether it is the last one among all the power supply modules in the power supplying state.

(B) The turn-on/off unit 201 sets two thresholds, a first threshold Ih and a second threshold II. When the current detection value received from the current detection unit 202 is higher than Ih, the turn-on/off unit 201 sends a power supply on signal to the power supply module at the next stage. When the current detection value received from the current detection unit 202 is lower than II and a power supply off request is received from the power supply module at the next stage, the turn-on/off unit 201 sends a power supply off signal to the power supply module at the next stage.

(C) In a case of a failure of a power supply module, it automatically instructs the power supply module at its next stage to switch to the power supplying state. In this case, the power supply module at its next stage, if in the off state, should be automatically turned on and replaces the failed power supply module for power supplying.

Figure 4:
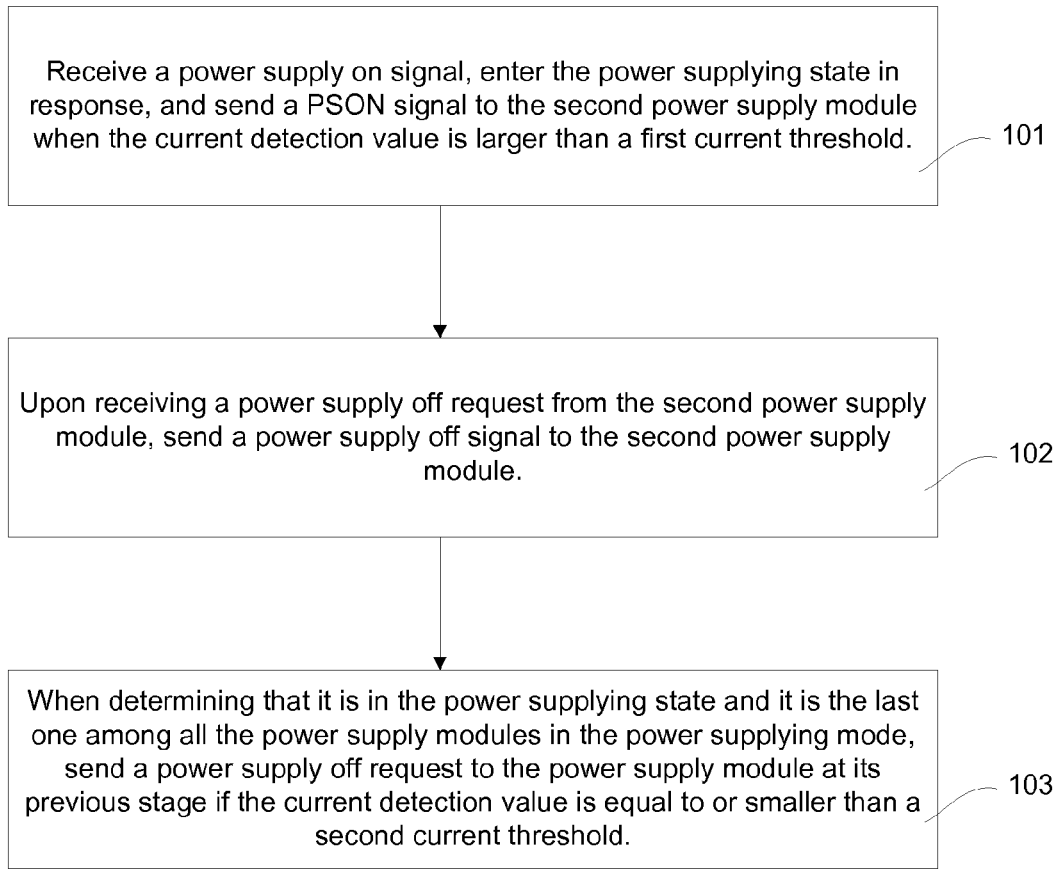
FIG. 4 is a flowchart illustrating a method for managing a plurality of power supply modules in an electronic device according to an embodiment of the present invention.

Corresponding to the above power supply module, a method for managing power supply in an electronic device is provided in the present invention, as shown in FIG. 4. The method is applied to a first power supply module in the electronic device. The electronic device includes at least two power supply modules which are turned on or off in a cascaded manner. The method includes the following steps.

At step 101, the first power supply module receives a power supply on signal, enters the power supplying state in response, and sends a power supply on (PSON) signal to the second power supply module when the current detection value is larger than a first current threshold.

At step 102, upon receiving a power supply off request from the second power supply module, the first power supply module sends a power supply off signal to the second power supply module.

At step 103, when the first power supply module determines that it is in the power supplying state and it is the last one among all the power supply modules in the power supplying state, the first power supply module sends a power supply off request to the power supply module at its previous stage if the current detection value is equal to or smaller than a second current threshold.

With the above solution, the power supply module itself is capable of automatically determining whether to turn on a new power supply module or not, without any human intervention. When the load power consumption of the electronic device increases, one or more power supply modules can be added and the power supplied by the power supply modules can be adjusted automatically. When the load power consumption of the electronic device decreases, one or more power supply modules can be automatically turned off. The operations involved in this process, such as current detection and current equalization are implemented inside the power supply modules. In this way, the original power distribution board can be simplified, or even eliminated, in which case the individual power supply modules can be connected by wire to reduce the cost.

In the method according to the embodiment of the present invention, there may be at least three power supply modules, e.g., the electronic device may include a third power supply module. In this case, after entering the power supplying state in response to the power supply on signal from the second power supply module, the third power supply module sends a power supply on feedback to the second power supply module. In this way, the first, second and third power supply modules jointly adjust their output power based on a power balancing rule preconfigured by an inter-module load balancing unit. The adjustment by the load balancing unit may or may not be a master-slave adjustment. That is, one power supply module may adjust the current of another power supply module, or the power supply modules are equal to each other and the load balancing operation can be automatically carried out based on a predetermined power balancing rule.

Further, the present invention provides a method for dynamically turning off power supply among a number of power supply modules. The electronic device includes at least two power supply modules, without loss of generality.

According to the present invention, the method for dynamically turning off power supply among a number of power supply modules includes the following steps when the load of the electronic device decreases.

At step 1, a second power supply module detects that its own current is lower than a second current turn-off threshold and sends a power supply off request to a first power supply module. In response to the power supply off request, the first power supply module returns a power supply off signal to the second power supply module. In response to the power supply off signal, the second power supply module turns itself off and sends a second power supply off feedback to the first power supply module.

At step 2, all the remaining power supply modules adjust their respective output power based on a power balancing rule preconfigured by an inter-module load balancing unit.

In the above method for dynamically turning off power supply among a number of power supply modules according to the present invention, there may be at least three power supply modules, e.g., the electronic device may include a third power supply module. The third power supply module turns itself off in response to the power supply off signal and sends a power supply off feedback for the third module to the second power supply module. The remaining two modules adjust their respective output power based on a power balancing rule preconfigured by an inter-module load balancing unit, such that the output power is balanced between the two modules.

Figure 5:
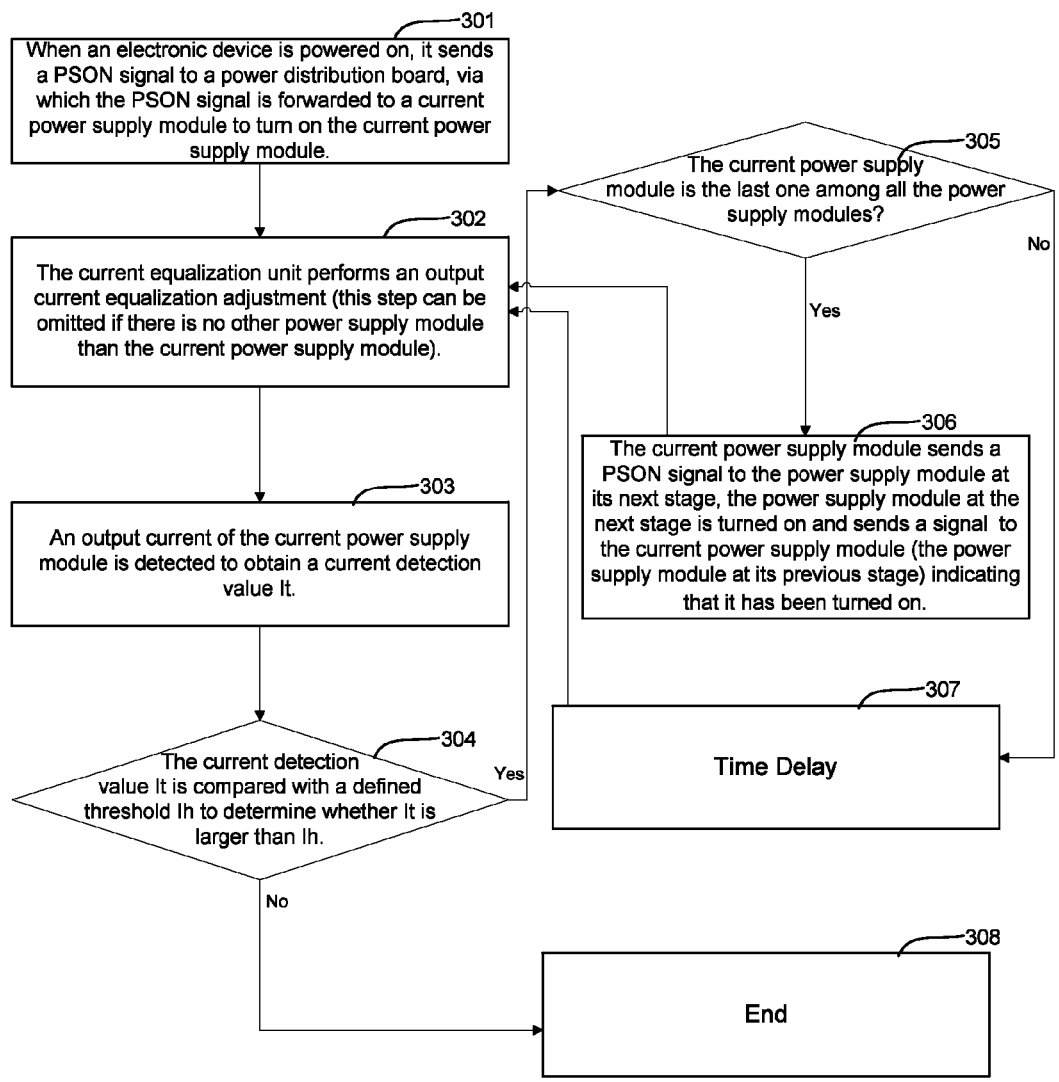
FIG. 5 is a schematic diagram of the process for turning on a power supply module according to an embodiment of the present invention.

With reference to FIG. 3, the process for turning on a power supply module includes the following steps, as shown in FIG. 5.

At step 301, when an electronic device is powered on, it sends a power supply on (PSON) signal to a power distribution board 200, via which the PSON signal is forwarded to a current power supply module. Upon receiving the PSON signal, the turn-on/off unit 201 in the current power supply module notifies the switching unit 206 to be turned on, such that the current power supply module is in the power supplying state.

For the power supply module at the next stage of the current power supply module, the current power supply module is the power supply module at its previous stage.

At step 302, the current equalization unit 203 performs an output current equalization adjustment. This step can be omitted if there is no other power supply module than the current power supply module.

Typically, the current equalization unit 203 in the power supply module which is just turned on is automatically assigned with a part of current and performs, together with other modules which are turned on, an automatic load balancing operation based on the current detection values of the current detection units in the respective power supply modules using a predetermined power balancing rule. Also, such adjustment is performed constantly in real time. As long as the load of the entire electronic device changes, the current equalization unit 203 in each power supply module in the power supplying state will try to perform such equalization/adjustment. If the number of power supply modules in the power supplying state or the overall load consumption of the system changes, the adjustment of the current equalization will be very significant. If the number of power supply modules and the overall power consumption do not change, the adjustment of the current equalization will be slight, insignificant, or even ignorable.

At step 303, an output current of the current power supply module is detected to obtain a current detection value It.

At step 304, the current detection value It is compared with a defined threshold Ih. If the current detection value It is larger than Ih, the process proceeds to step 305; otherwise the process proceeds to step 308.

At step 305, it is determined whether the current power supply module is the last one among all the power supply modules in the power supplying state. If so, a power supply on (PSON) signal is sent to the power supply module at the next stage and the process proceeds to step 306; otherwise the process proceeds to step 307.

At step 306, after entering the power supplying state, the power supply module at the next stage sends a signal VS to the current power supply module (the power supply module at its previous stage) indicating that it has been turned on. This signal VS will reach the turn-on/off unit 206 in the power supply module at its previous stage. The process then proceeds to step 302.

At step 307, a time delay is introduced and the process then proceeds to step 302.

At step 308, the process ends.

An application scenario in which the above solutions can be applied is provided. For the purpose of illustration, the first power supply module is assumed to be the current power supply module. In this case, after being turned on, the first power supply module detects the value of the current immediately and sends the current detection value to the turn-on/off unit 201. The turn-on/off unit 201 compares the current detection value with a defined threshold Ih and sends a power supply on signal to the second power supply module at its next stage immediately if the current detection value is larger than Ih. After being turned on and entering the power supplying state, the second power supply module sends a signal VS to the first power supply module indicating that it has been turned on, and automatically performs output current equalization/adjustment together with the first power supply module, so as to achieve load balance. Similarly, if there is any more power supply module, it is to be determined in the subsequent process whether to turn on a third power supply module and any further power supply module(s).

Figure 6:
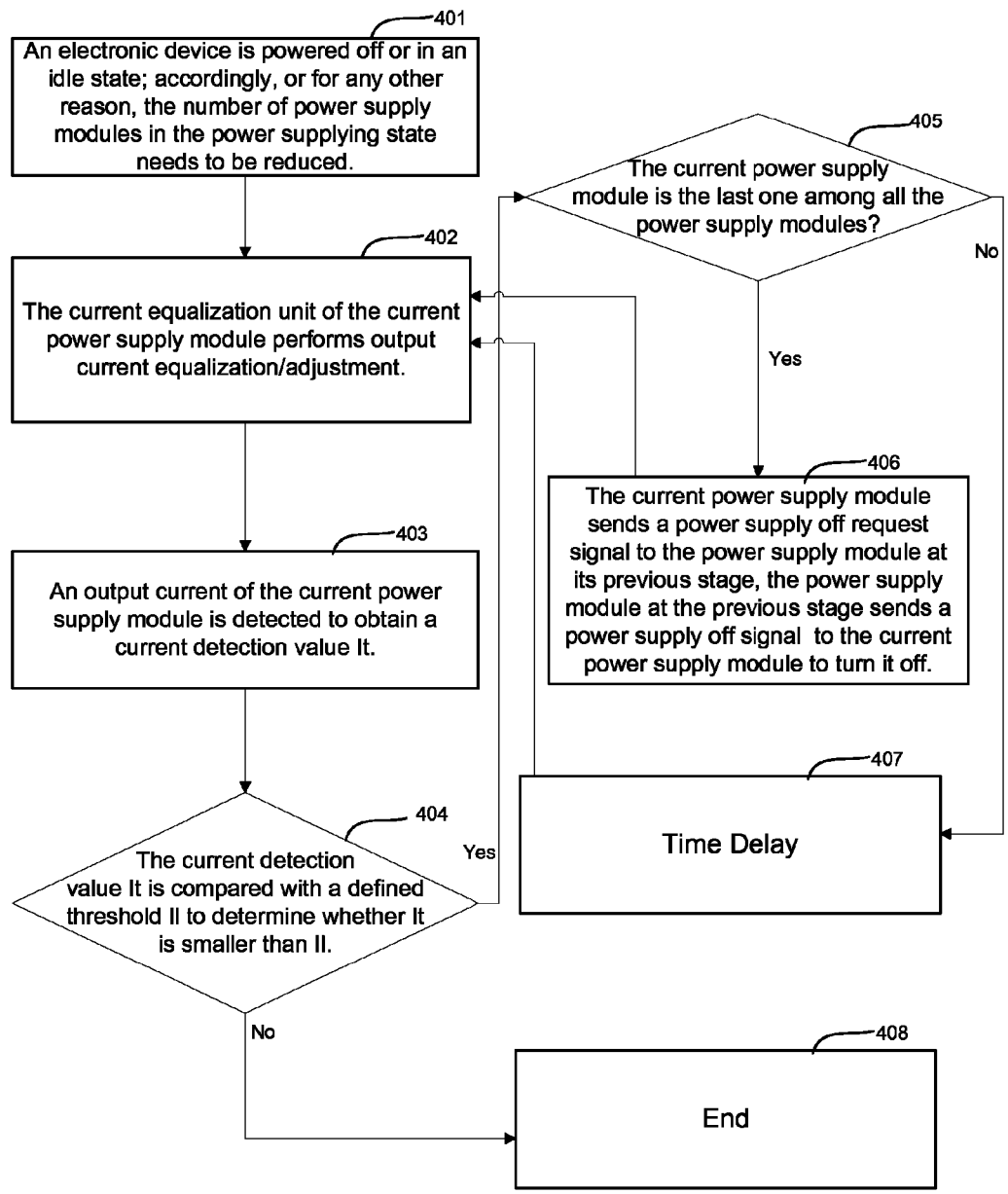
FIG. 6 is a schematic diagram of the process for turning off a power supply module according to an embodiment of the present invention.

With reference to FIG. 3, a process for turning off a power supply module includes the following steps, as shown in FIG. 6.

At step 401, the load power consumption of the electronic device decreases because the electronic device enters an idle state or due to any other reason, and the number of power supply modules in the power supplying state needs to be reduced.

At step 402, the current equalization unit 203 of the current power supply module performs output current equalization/adjustment. This step can be omitted if there is no other power supply module than the current power supply module.

For a power supply module at the next stage of the current power supply module, the current power supply module is the power supply module at its previous stage.

At step 403, an output current of the current power supply module is detected to obtain a current detection value It.

At step 404, the current detection value It is compared with a defined threshold Il. If the current detection value It is smaller than Il, the process proceeds to step 405; otherwise the process proceeds to step 408.

At step 405, it is determined whether the current power supply module is the last one among all the power supply modules in the power supplying state. If so, a power supply off request signal is sent to the power supply module at the previous stage and the process proceeds to step 406; otherwise the process proceeds to step 407.

At step 406, the current power supply module sends a power supply off request signal to the power supply module at its previous stage, which then sends a power supply off signal to the current power supply module to turn off the current power supply module. The current power supply module turns itself off, and the process proceeds to step 402.

At step 407, a time delay is introduced and the process then proceeds to step 402.

At step 408, the process ends.

There is an exception that, when the electronic device needs to turn off all of its power supply modules using its switch, it sends a power supply off signal to a particular power supply module, which then sends the power supply off signal to the power supply module at its next stage. In this way, the power supply off signal is forwarded stage by stage until it reaches the last power supply module and all of the power supply modules are turned off. Here, the particular power supply module is the first one in the sequence of the power supply modules, which is not equivalent to the "first power supply module" as mentioned above.

According to the operating principle described with reference to FIG. 5 and in the above steps, an application scenario is assumed that an electronic device has four or even more power supply modules, among which the first three power supply modules are in the power supplying state and the fourth and subsequent power supply modules (if any) are in the off state. Since the electronic device is now in the idle state, its load power consumption decreases. There are three power supply modules in the power supplying state and the current detection unit 202 in each of the three power supply modules detects that its output current is lower than the threshold Il.

The fourth power supply module is in the off state and its output voltage detection value VS=0, which is sent to the third power supply module. Based on this, the third power supply module determines that the fourth power supply module is in the off state and thus determines that it is the last one among all the power supply modules in the power supplying state. At this time, the third power supply module is in the power supplying state and its voltage detection unit 205 detects the output voltage VS and sends the output voltage VS to the second power supply module. The turn-on/off unit 201 of the second power supply module determines that the third power supply module is in the power supplying state. Based on this, the second power supply module determines that it is not the last one among all the power supply modules in the power supplying state. Similarly, the first power supply module determines that the second power supply module is in the power supplying state. Based on this, the first power supply module determines that it is not the last one among all the power supply modules in the power supplying state.

The third power supply module performs logical comparison, including determining that it is the last one among all the power supply modules in the power supplying state since the fourth power supply module is in the off state, and that the current detection value is smaller than the threshold II. Thus, the third power supply module sends a power supply off request signal to the second power supply module. At this time, although the second power supply module also detects that the current is lower than II, it does not send a power supply off request to the first power supply module since it is not the last one among all the power supply modules in the power supplying state (the third power supply module is still in the power supplying state).

The second power supply module sends a power supply off signal to the third power supply module. The second power supply module performs current equalization/adjustment together with the first power supply module and then determines whether to send a power supply off request to the first power supply module or not, and so on.

With the above solution, it is possible to automatically determine whether to turn on a new power supply module or not. When the load power consumption of the electronic device is relatively high, one or more power supply modules can be automatically added and the power supplied by the power supply modules can be adjusted automatically. The entire process is completely automated without any human intervention. All the circuits for detection, determination and power supply efficiency control are implemented inside the power supply modules. In this way, the power distribution board can be greatly simplified, or even eliminated, in which case the individual power supply modules can be connected by wire to reduce the cost.

The embodiments of the present invention have the following advantageous effects. The individual power supply modules are turned on or off in a cascaded manner. The power supply on and off signals are no longer provided by a single power distribution board to the respective power supply modules. Instead, a power supply module sends the power supply on and off signals to the power supply module at its next stage.

A power supply module is capable of determining whether it is the last one among all the power supply modules in the cascaded structure which are in the power supplying state. When the last power supply module determines that its own current is approaching a maximum value, it triggers and outputs a power supply on signal to the power supply module at its next stage to turn it on. All the power supply modules which are turned on, newly or previously, jointly re-assign the output current evenly, such that the current of the power supply module at the previous stage will automatically decrease.

If the load power consumption of the electronic device decreases, the last power supply module among all the power supply modules in the power supplying state detects the current. When it determines that its actual output load is much lower than its nominal load, it sends a power supply off request to the power supply module at its previous stage (i.e., the last-but-one power supply module among all the power supply modules in the power supplying state) and turns it off after receiving a power supply off signal from the power supply module at its previous stage. All the remaining power supply modules in the power supplying state perform current equalization and assignment again. The last-but-one power supply module performs the same detection and determines whether to turn itself off, and so on.

With this solution, the power supply module in the power supplying state can automatically determine whether to turn on a new power supply module or whether to turn itself off, so as to achieve a configuration in which the redundant power supply modules can be automatically adjusted. When the load power consumption is low, one or more power supply modules can be automatically turned off, so as to achieve the effects of efficiency improvement and power saving. When the load power consumption is high, one or more power supply modules can be automatically added. The power supply modules are sequentially turned on from one stage to its next stage, and turned off from one stage to its previous stage. The entire process is completely automated without any human intervention. All the circuits for detection, determination and power supply efficiency control are implemented inside the power supply modules. In this way, the power distribution board can be greatly simplified, or even eliminated, in which case the individual power supply modules can be connected by wire to reduce the cost.

It should be noted that the above embodiments are provided only to illustrate, rather than limiting, the present invention. All the parameter values may vary depending on actual implementation and are encompassed by the scope of the present invention. It should be understood by those skilled in the art that modifications or equivalent alternatives can be made to the solutions of the present invention without departing from the spirit and scope of the present invention. All these modifications and equivalent alternatives are encompassed by the scope of the present invention as defined by the attached claims.

What is claimed is:

1. A power supply module used as a first power supply module in a computing system which further comprises a second power supply module, the first power supply module being in a power supplying state and the second power supply module being in an off state, the first power supply module comprising:
   a load detection unit configured to detect load of the computing system to generate a load detection value;
   a determination unit connected to the load detection unit and configured to generate determination information based on the load detection value for determining whether to turn on the second power supply module or not; and
   a turn-on/off unit configured to send a power supply on (PSON) signal to the second power supply module when the determination information indicates that the second power supply module is to be turned on,
   wherein the second power supply module is turned on in response to the PSON signal, such that the turned on second power supply module and the first power supply module supply power to the computing system in parallel,
   wherein the load detection unit comprises a current detection unit configured to detect an output current from the first power supply module itself and generate a current detection value as the load detection value,
   wherein the determination unit is configured to determine to turn on the second power supply module when the current detection value is larger than a first current threshold, and
   wherein the second power supply module in turn selectively determines whether to turn on a third power supply module so as to supply power to the computing system in parallel with the first and second power supply modules.

2. The power supply module of claim 1, further comprising:
a voltage detection unit configured to detect its own output voltage and convert it into a voltage detection value for outputting,
wherein the power supply module determines that it is in the power supplying state when the voltage detection value is larger than an operating voltage threshold.

3. The power supply module of claim 1, further comprising:
a current equalization unit configured to adjust output currents from the first power supply module and the second power supply module based on a predetermined power balancing rule, such that the output current from each of the power supply modules is equalized.

4. The power supply module of claim 1, further comprising:
an emergency module configured to send an emergency instruction to the second power supply module in a case of a failure of the first power supply module itself, instructing the second power supply module to switch to the power supplying state and replace the first power supply module for power supplying.

5. A power supply module used as a third power supply module in a computing system which further comprises a first power supply module and a second power supply module, each of the first power supply module, the second power supply module and the third power supply module being in a power supplying state such that the first power supply module, the second power supply module and the third power supply module supply power to the computer system in parallel, the third power supply module comprising:
a load detection unit configured to detect load of the computing system to generate a load detection value;
a determination unit configured to generate determination information based on the load detection value for determining whether to turn off the third power supply module or not; and
a turn-on/off unit configured to send request information to the first second power supply module when the determination information indicates that the third power supply module is to be turned off, instructing the second power supply module to send a power supply off signal to the third power supply module,
wherein the third power supply module is turned off in response to the power supply off signal,
wherein the load detection unit comprises a current detection unit configured to detect its own output current and generate a current detection value as the load detection value,
wherein the determination unit is configured to determine to turn off the third power supply module itself when the current detection value is smaller than a current threshold, and
wherein, when the third power supply module is turned off, the second power supply module in turn selectively determines whether to turn off by selectively instructing the first power supply module to send a power supply off signal to the second power supply module.

6. The power supply module of claim 5, wherein the third power supply module further comprises:
a voltage detection unit configured to detect its own output voltage and convert it into a voltage detection value for outputting,
wherein the third power supply module determines that it is in the power supplying state when the voltage detection value is larger than an operating voltage threshold.

7. A power supply system comprising at least three power supply modules and a power distribution board, wherein
the at least three power supply modules comprise a first power supply module, a second power supply module and a third power supply module, used in a computing system
wherein:
the first power supply module is in a power supplying state and the second power supply module is in an off state, and the first power supply module comprises:
a load detection unit configured to detect load of the computing system to generate a load detection value, comprising a current detection unit configured to detect an output current from the first power supply module itself and generate a current detection value as the load detection value;
a determination unit connected to the load detection unit and configured to generate determination information based on the load detection value for determining whether to turn on the second power supply module or not; and
a turn-on/off unit configured to send a power supply on (PSON) signal to the second power supply module when the determination information indicates that the second power supply module is to be turned on, and
wherein the second power supply module is turned on in response to the PSON signal, such that the turned on second power supply module and the first power supply module supply power to the computing system in parallel;
wherein the load detection unit comprises:
a current detection unit configured to detect an output current from the power supply module itself and generate a current detection value as the load detection value, and
wherein the determination unit is configured to determine to turn on the second power supply module when the current detection value is larger than a first current threshold; and
wherein the second power supply module in turn selectively determines whether to turn on the third power supply module so as to supply power to the computing system in parallel with the first and second power supply modules;
or:
each of the first power supply module, the second power supply module and the third power supply module is in a power supplying state, such that the first power supply module, the second power supply module and the third power supply module supply power to the computer system in parallel, and the third power supply module comprises:
a load detection unit configured to detect load of the computing system to generate a load detection value, comprising a current detection unit configured to detect its own output current and generate a current detection value as the load detection value;
a determination unit configured to generate determination information based on the load detection value for determining whether to turn off the third power supply module or not; and a turn-on/off unit configured to send request information to the second power supply module when the determination information indicates that the third power supply module is to be turned off, instructing the first second power supply module to send a power supply off signal to the third power supply module, and wherein the third power supply module is turned off in response to the power supply off signal, wherein the load detection unit comprises: a current detection unit configured to detect its own output current and generate a current detection value as the load detection value, wherein the determination unit is configured to determine to turn off the third power supply module itself when the current detection value is smaller than a second current threshold, and wherein, when the third power supply module is turned off, the second power supply module in turn selectively determines whether to turn off by selectively instructing the first power supply module to send a power supply off signal to the second power supply module.

8. The power supply system of claim 7, further comprising:

a signal support module configured to support the following signals by using discrete circuit transmission or software protocol:

the power supply on signal and the power supply off signal sent from the first or second power supply module to the second or third power supply module;

the power supply on signal and the power supply off signal received from the first or second power supply module at the second or third power supply module;

the voltage detection value received from the second or third power supply module at the first or second power supply module;

a power supply off request sent from the first or second power supply module to the second or third power supply module; and a power supply off request received from the second or third power supply module at the first or second power supply module.

* * * * *

UNITED STATES PATENT AND TRADEMARK OFFICE
CERTIFICATE OF CORRECTION

PATENT NO. : 9,703,363 B2  
APPLICATION NO. : 13/812128  
DATED : July 11, 2017  
INVENTOR(S) : Jianjun Zhou Page 1 of 1

It is certified that error appears in the above-identified patent and that said Letters Patent is hereby corrected as shown below:

Column 17, Line 42:  
Delete "first second"  
Insert --second--

Column 19, Line 5:  
Delete "first second"  
Insert --second--

Signed and Sealed this  
Thirty-first Day of July, 2018

Andrei Iancu  
*Director of the United States Patent and Trademark Office*